United States Patent
Ponnaganti et al.

(10) Patent No.: US 11,636,415 B2
(45) Date of Patent: Apr. 25, 2023

(54) SYSTEMS AND METHODS FOR SUPPLY MANAGEMENT

(71) Applicant: E. & J. Gallo Winery, Modesto, CA (US)

(72) Inventors: Suraj Ponnaganti, Modesto, CA (US); Ambarish M. Acharya, Modesto, CA (US)

(73) Assignee: E. & J. Gallo Winery, Modesto, CA (US)

( * ) Notice: Subject to any disclaimer, the term of this patent is extended or adjusted under 35 U.S.C. 154(b) by 0 days.

(21) Appl. No.: 17/035,378

(22) Filed: Sep. 28, 2020

(65) Prior Publication Data

US 2022/0101231 A1 Mar. 31, 2022

(51) Int. Cl.
| | |
|---|---|
| G06Q 10/06 | (2012.01) |
| G06Q 10/08 | (2012.01) |
| G06Q 30/02 | (2012.01) |
| G06Q 10/0631 | (2023.01) |
| G06Q 10/0635 | (2023.01) |
| G06Q 10/067 | (2023.01) |
| G06Q 10/087 | (2023.01) |
| G06Q 30/0201 | (2023.01) |

(52) U.S. Cl.
CPC ..... *G06Q 10/06315* (2013.01); *G06Q 10/067* (2013.01); *G06Q 10/0635* (2013.01); *G06Q 10/087* (2013.01); *G06Q 30/0206* (2013.01)

(58) Field of Classification Search
CPC ......... G06Q 10/06315; G06Q 10/0635; G06Q 10/067; G06Q 10/087; G06Q 30/0206
USPC ...................................................... 705/7.25
See application file for complete search history.

(56) References Cited

U.S. PATENT DOCUMENTS

| | | | |
|---|---|---|---|
| 2005/0158798 A1* | 7/2005 | Sher | C12G 1/00 426/11 |
| 2007/0185759 A1* | 8/2007 | Kataria | G06Q 10/087 705/300 |
| 2009/0164262 A1* | 6/2009 | Ettl | G06Q 10/06 705/7.12 |
| 2011/0307087 A1* | 12/2011 | Degbotse | G05B 19/41865 700/101 |
| 2012/0116563 A1* | 5/2012 | Bippert | G06Q 30/02 700/99 |
| 2012/0116565 A1 | 5/2012 | Bippert et al. | |

(Continued)

OTHER PUBLICATIONS

Valdés, Managing uncertainty in agroforestry problems: Applications of operation research models and methodologies in the wine and forestry industries, PhD diss., Pontificia Universidad Catolica de Chile (Chile) (2016) (Year: 2016).*

(Continued)

*Primary Examiner* — Charles Guiliano
(74) *Attorney, Agent, or Firm* — Goodwin Procter LLP

(57) ABSTRACT

Systems and methods are described for managing a supply of building blocks for one or more products. An example method includes: obtaining demand data for each building block from a plurality of building blocks; obtaining substitution data for the plurality of building blocks; providing the demand data and the substitution data as input to a predictive model; receiving as output from the predictive model a predicted optimal production quantity for each building block; and facilitating a production of the plurality of building blocks according to the predicted optimal production quantities.

19 Claims, 12 Drawing Sheets

(56) References Cited

U.S. PATENT DOCUMENTS

2017/0277568 A1* 9/2017 Lu .................... G06Q 10/06312
2021/0209705 A1* 7/2021 Englard ............... A01B 79/005

OTHER PUBLICATIONS

Bassok, Yehuda, et al., "Single-period multiproduct inventory models with substitution," Operations Research, 47.4 632-642, 1999.
Espinoza, Daniel, "Solving simple Stochastic Optimization Problems with Gurobi," webinar, 2018, available at: https://www.gurobi.com/resource/solving-simple-stochastic-optimization-problems-with-gurobi/.
Gallo, Amy, "The Value of Keeping the Right Customers," Oct. 29, 2014, available at: <https://hbr.org/2014/10/the-value-of-keeping-the-right-customers>.
Shapiro, Alexander, et al., "A Tutorial on Stochastic Programming," Mar. 21, 2007.
Rao, Uday S., et al., "Multi-product inventory planning with downward substitution, stochastic demand and setup costs," IIE Transactions, 59-71, Aug. 17, 2010.
"How to Read a Wine Label," Napa Valley Vintners, Jul. 1, 2019, available at: <https://napavintners.com/wines/how_to_read_a_wine_label.asp>.
Written Opinion and International Search Report for International Patent Application No. PCT/US2021/051894, dated Dec. 22, 2021 (14 pages).

* cited by examiner

SYSTEMS AND METHODS FOR SUPPLY MANAGEMENT

TECHNICAL FIELD

The following disclosure relates to systems and methods for managing a supply of building blocks for producing one or more products and, in certain examples, to systems and methods for managing a supply of grape juice varieties for producing wine products.

BACKGROUND

Balancing supply and demand is a constant challenge that most manufacturing industries battle. Imbalance in supply and demand can have detrimental effects on efficiency, utilization, capacity, and more. Excess supply can create storage capacity problems and additional holding costs. In extreme circumstances, excess supply can also trigger capital intensive solutions like capacity expansions, unnecessary promotional activities to sell excess products or simply dumping product. On the other hand, undersupply can lead to stock outs, expedited manufacturing and shipping, purchases from third party vendors, and other undesirable consequences. Sustained stock outs can force customers to move to competitors, and regaining lost customers is expensive. Hence, there is a need for improved systems and methods for efficiently planning and managing supply for a given demand forecast.

SUMMARY

Systems and methods are described for managing a supply of building blocks for one or more products. An example method includes: obtaining demand data for each building block from a plurality of building blocks; obtaining substitution data for the plurality of building blocks; providing the demand data and the substitution data as input to a predictive model; receiving as output from the predictive model a predicted optimal production quantity for each building block; and facilitating a production of the plurality of building blocks according to the predicted optimal production quantities. These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
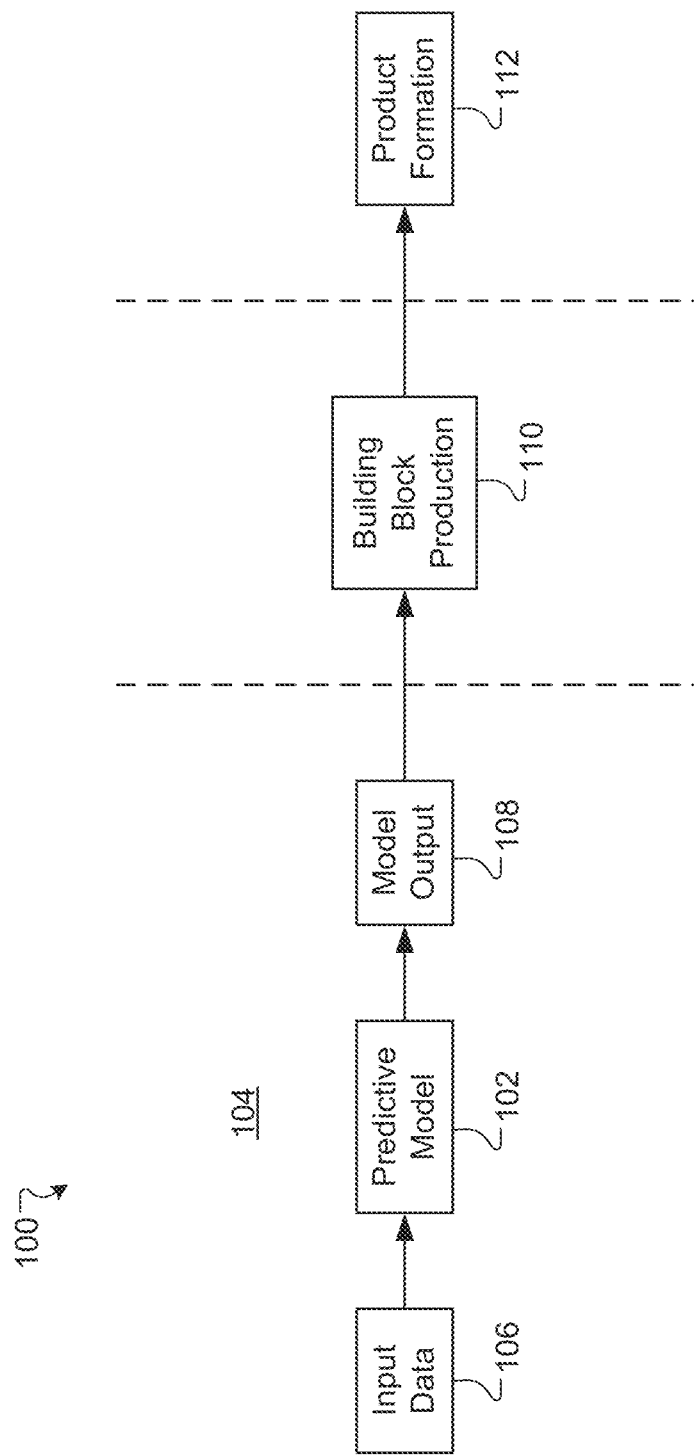
FIG. 1 is a schematic timeline having a planning stage, a building block production stage, and a product formation stage, according to an exemplary embodiment.

Embodiments of the systems and methods described herein relate to techniques for managing a supply of building blocks used to produce one or more products. In a typical example, the building blocks are prepared at least a year before the building blocks are combined to form the products. For example, the building blocks can be grape juice varieties used to produce wine. Such grape juice varieties are typically prepared and aged for 1, 2, 3, or more years before being combined to form a wine product. This delay between an initial time when building blocks are prepared and a later time when the building blocks are combined presents significant supply management challenges. A further complication is that building blocks can often be substituted for one another, for example, to replace a building block in short supply with a building block in excess supply. Additionally, design requirements or industry or government regulations may impose constraints that prevent certain substitutions from being made or limit substitution amounts. All of these factors (e.g., the time delay, permissible substitutions, and constraints) can make it extremely difficult to manage the supply of building block materials for certain products, such as wine. Failure to properly manage supplies can result in significant harm to the business.

Advantageously, the systems and methods described herein can be used to accurately predict desirable or optimal quantities of building blocks for the production of wine, semiconductors, blood banks, and similar products. In certain examples, the systems and methods can be used to generate or obtain a demand distribution and cost data (e.g., unit cost and/or margin) for each building block. The systems and methods can also be used to generate or obtain information related to permissible substitutions for the building blocks, including substitution costs and any constraints on substitutions. The demand distribution, cost data, and substitution information can be provided as inputs to a predictive model, and the predictive model can provide as output information and recommendations related to the amount of each building block to produce. The model can utilize two-stage stochastic programming with recourse. In some implementations, the model can perform or consider a risk assessment, such as conditional value at risk.

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

Disclosed herein are exemplary embodiments of methods and supporting systems for managing a supply of building blocks used to produce one or more products. In various examples, a building block can be or include a product component or ingredient that can be combined with other building blocks to produce the product. For example, in the wine industry, a building block can be a variety of grape juice, which can be blended with other varieties of grape juice to produce wine products. In certain implementations, the products can be or relate to food, beverages, medicines, machines, semiconductors, polymers, and the like.

Referring to FIG. 1, in various examples, a system 100 utilizes a predictive model 102 during a planning stage 104 to determine how much of each building block to produce. The predictive model 102 can receive input data 106 such as, for example, (i) demand distributions for each building block, (ii) cost data (e.g., a unit cost and/or a profit margin) for each building block, (iii) an identification of permissible substitutions for building blocks, (iv) an identification of any constraints on amounts that can be substituted among building blocks, (v) a substitution cost associated with substituting one building block for another building block, and/or (vi) any combination thereof. The predictive model 102 can use the input data 106 to explore a large number of possible scenarios (e.g., 10,000, 100,000, 1,000,000 or more scenarios) and generate model output 108, which can be or include, for example, predicted production quantities (e.g., desired or optimal quantities) for each building block. In certain implementations, there can be a tradeoff between number of building blocks and number of scenarios that can be run. For example, an increase in number of building blocks can exponentially increase convergence time for the model and/or can limit the number of scenarios that can be run (e.g., due to computation time constraints). In some instances, the predictive model 102 can perform a risk analysis (e.g., using conditional value at risk) to predict production quantities according to a risk tolerance for exposure to high costs or losses, as described herein. Next, during a building block production stage 110, the building blocks can be produced according to the predicted quantities. In the case of wine products, for example, this can involve growing, harvesting, crushing, fermenting, and/or filtering grapes, and aging the resulting grape juice for extended periods of time (e.g., 6 months, 1 year, 2 years, 3 years, 4, years, or longer). Finally, during a product formation stage 112, the building blocks can be combined and substituted, as needed and permitted, to produce the final products.

In general, the importance of managing stock levels of products properly cannot be denied. Purchasing decisions of raw materials are often based on forecasts and the variability in demand, considering optimal sourcing strategies. Such decisions can be complex due to demand variability, and no business is comfortable with losing demand due to lack of supply. While the wine industry is no exception, there can be additional layers of complexity for wine production. For example, a lack of supply in a certain grape varietal can be substituted with another varietal to a certain degree. Advantageously, the subject matter described herein can provide insights into establishing target stock levels under demand uncertainty and substitutability. While much of the discussion herein relates to wine products, it is understood that the systems and methods are equally applicable to other products or industries, such as, for example, semiconductors, liquor and other beverages, food, polymers, and/or blood bank inventory management. In general, the systems and methods can be particularly applicable to supply management in any instance where manufacturing lead times are lengthy (e.g., several months, years, or more) and/or where building blocks can be substituted for one another.

For example, the wine industry has a unique feature that adds additional complexity to the supply planning process—long manufacturing lead times due to aging. Depending on the product, for example, total process lead time can range from 2-3 years, on average, or longer. Grapes purchased in a given year can be used to satisfy demand 2-3 years out. Forecasted demand can be a key input in any supply planning process. Hence, long-range forecasting accuracy can be extremely important but a difficult target to achieve. Forecasting accuracy usually declines drastically beyond about 78 weeks, and inaccurate forecasts can make grape supply planning challenging. For example, shortages in wine supply for a product can be difficult to handle and there is generally no way to expedite grape fermentation. On the other hand, excess supply can lock up storage tank capacity. Excess supply can be depleted by selling wine in bulk market, introducing new brands, or simply holding the wine for next year; however, each of these options can reduce profit margins. Further, additional uncertainties around new product introductions, weather and natural calamities (e.g., forest fires or drought), and legal regulations can make grape supply planning extremely challenging.

In various examples, the grape supply planning process can start with forecasted demand for finished goods (e.g., wine products) two or more years out. This finished goods demand can be converted to grape-tonnage requirements using a wine formula or recipe that is unique to each product. For example, one 750 ml bottle of wine could have 500 ml of California Chardonnay, 200 ml of Lodi Pinot Noir, and 50 ml of other ingredients. There is some degree of flexibility (fungibility) in wine recipes. For example, when there is not enough supply for 500 ml of California Chardonnay, the California Chardonnay may be substituted with a blend of California Chardonnay and Sonoma Chardonnay/Pinot Noir. The wine recipe can be used to convert the finished goods forecast (e.g., in bottles or cases) to required amounts of specific grape juice varieties (e.g., in gallons), which can serve as building blocks for the wine products. The grape juice building blocks can be converted to tons based on a historical yield rate for the respective grape at a given processing plant. For example, 300 gallons of a specific grape can equal two tons if each ton yields 150 gallons of grape juice. In short, these gallons or tons can become base grape requirements to satisfy future demand (e.g., 1, 2, 3, 4, or more years out). A planning team can also look at other factors such as expected new product introductions, future grape supply positions in vineyards, and/or potential bulk market purchases or sales, to add or subtract to the forecasted tons derived from demand forecasts. Advantageously, the systems and methods described herein can provide a supply management approach that takes into consideration forecast errors and/or leverages fungibility in wine recipes. In some examples, the systems and methods can achieve risk reduction (variability reduction) through one or more control parameters, which can be determined or specified by the wine producer or other product manufacturer.

In various examples, grapes that are crushed, fermented, and/or filtered can be building blocks for chardonnay, merlot, or other wine products. These grape juice building blocks can be blended in different proportions to achieve desired wine styles. The coverage duration of the building blocks can be measured using months of supply (MOS), which can be calculated from $$MOS = \frac{\text{Total supply in gallons}}{\text{Average monthly demand in gallons}}. \quad (1)$$

An MOS of more than 12 months for any building block indicates that supply exceeds demand over the next 12 months. This can be referred to as being "long." Similarly, an MOS of less than 12 months indicates that supply is less that demand over the next 12 months. This can be referred to as being "short." Months long and months short can be calculated as follows:

$$\text{Months long}=\max(MOS-12,0) \quad (2)$$

and $$\text{Months short}=\max(12-MOS,0). \quad (3)$$

In many instances, building blocks that are short may be at risk of not meeting demand over the next year. In the case of wine production, however, it not necessarily a problem if a building block is short provided that it can be substituted with another building block that is long. While a slightly long MOS can be desirable to account for variability in forecasts, being too long can end up locking storage capacity in tanks. This can leave less storage space for grapes crushed the following year.

In various examples, MOS can be used to plan for future target stock levels as well as understand current state stock levels. When the current state MOS for multiple building blocks is more than 6 to 12 months long, for example, many tanks may be required to store excess supply, thereby leaving less space for newer building blocks. Excess supply can be due to poor planning caused by insufficient insight into target stock levels for building blocks.

Advantageously, the systems and methods described herein can establish or predict target stock levels (e.g., optimal levels) for building blocks that reduce or minimize carrying costs, lost opportunity cost, and/or substitution cost. Carrying cost can be incurred when supply exceeds demand, and lost opportunity cost can be incurred when demand exceeds supply. In some instances, however, excess supply or demand may be calculated after substitution decisions are made, for example, to substitute one building block for another. Some or all supply shortages for a building block can be satisfied through substitutions from a different building block having a surplus. Such substitutions can lead to or be associated with a substitution cost, as described herein.

In general, it can be desirable to perform descriptive and diagnostic analytics to understand how a primary metric has been performing and to determine all the variables on which the primary metric depends. In one example, preliminary analysis of MOS data can indicate that supply positions for one or more building blocks are long. For example, MOS targets may have been set during a planning process through experience-based decisions, which can lead to year-over-year accumulation of inventory. Alternatively or additionally, the MOS targets may have been based on a poor understanding of what constitutes a proper target MOS. Further analysis of MOS data can indicate that inaccurate forecasts may contribute to higher supply positions.

Figure 2:
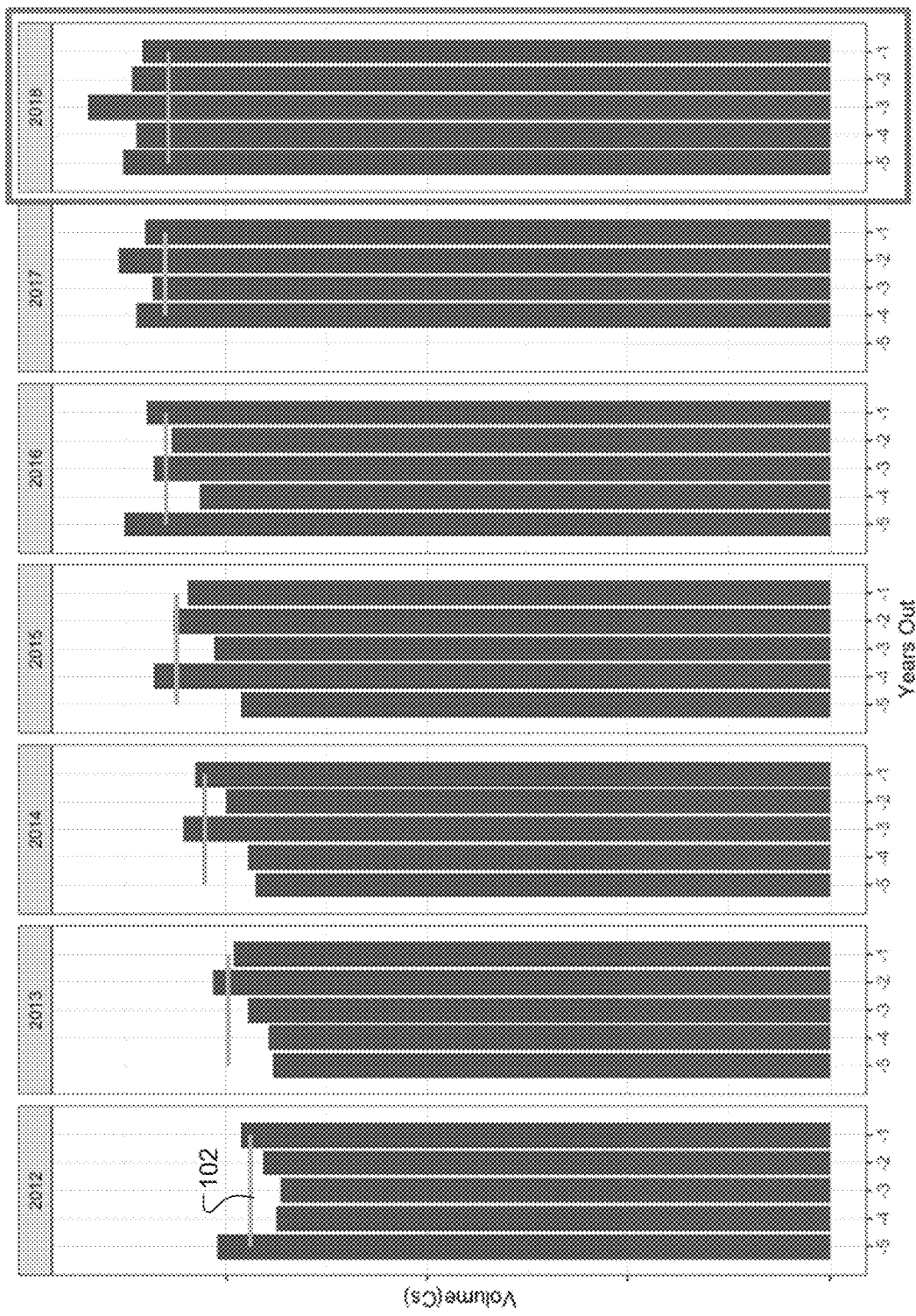
FIG. 2 is a sequence of bar graphs showing forecasted and actual demands for a product or building block during successive years, according to an exemplary embodiment.

Such forecast inaccuracies can be seen in FIG. 2, which includes a sequence of bar graphs 200 for years 2012 through 2018. The x-axis for each year represents lag years between forecast and actual, and the y-axis represents a volume, in cases (e.g., of wine). Considering the bar graph for 2018, for example, an x-axis value of −5 represents a forecast made in 2013, five years before 2018. Each bar in FIG. 2 represents a forecasted demand for the corresponding year. The horizontal line 102 for each year represents an actual, realized demand (e.g., total sales) for that year.

Figure 3A:
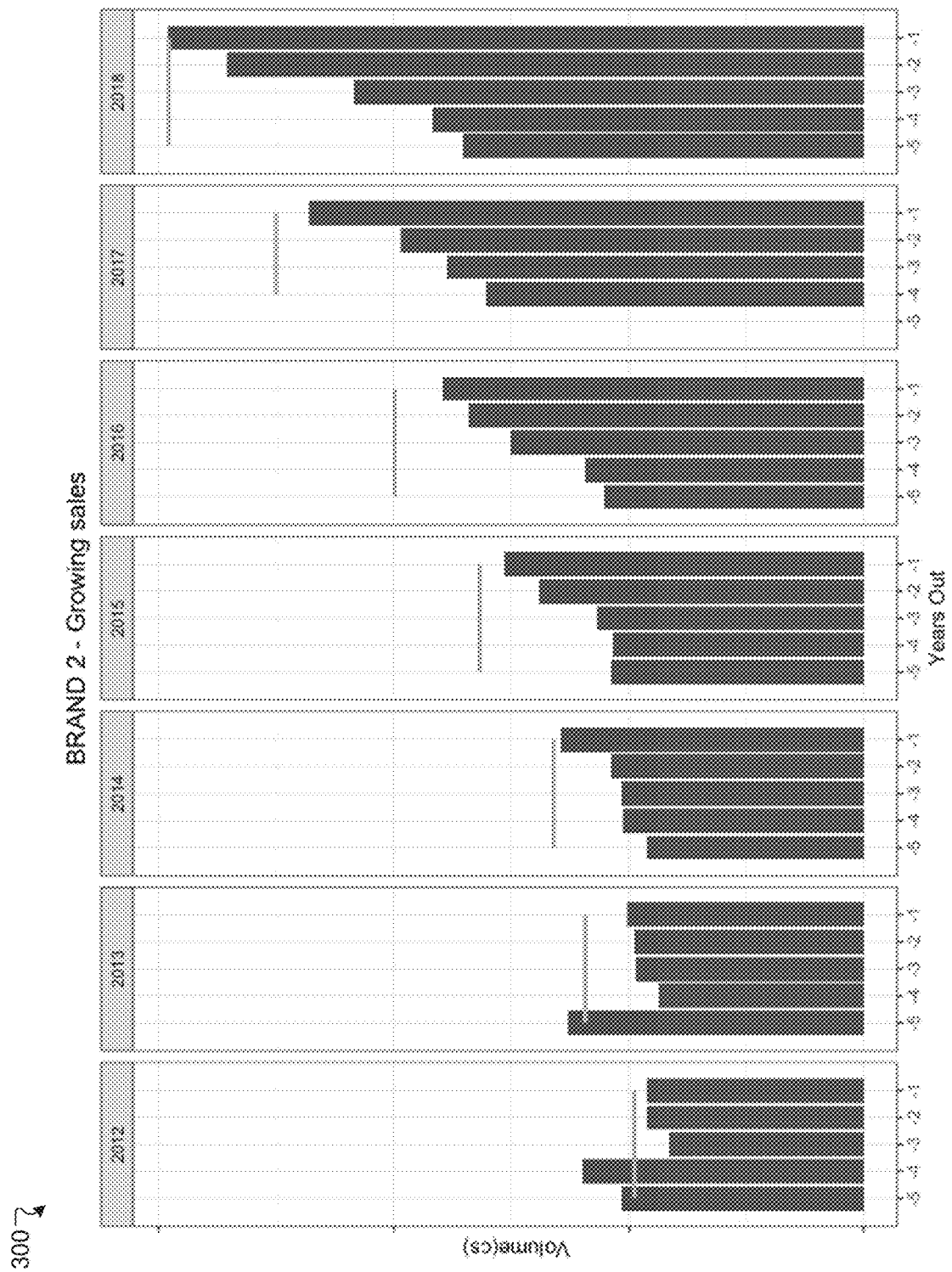
FIG. 3A is a sequence of bar graphs showing forecasted and actual demands for a product or building block during successive years when product sales were growing, according to an exemplary embodiment.
Figure 3B:
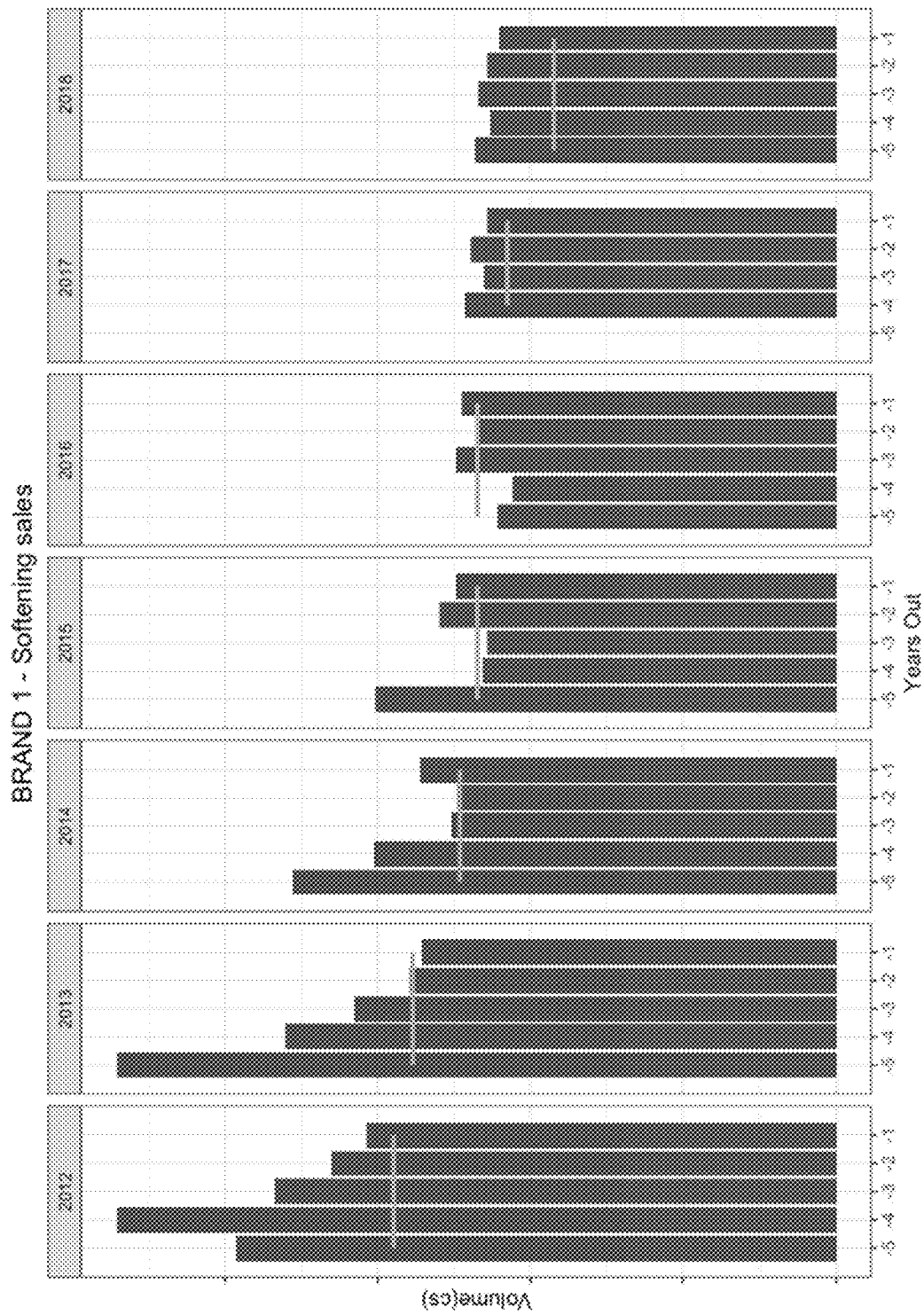
FIG. 3B is a sequence of bar graphs showing forecasted and actual demands for a product or building block during successive years when product sales were softening, according to an exemplary embodiment.

FIG. 2 reveals an interesting behavior in forecasted sales and actual sales. When a business or a brand is growing, forecasts tend to underestimate sales, and when sales are softening, forecasts tend to overestimate sales. This behavior can become more prominent at a brand level, as shown in FIGS. 3A and 3B, which include bar graphs 300 and 350, respectively, for situations in which sales are growing and softening, respectively. Such behavior can be quantified using bias, which can calculated as follows:

$$bias = \frac{\text{forecasted sales} - \text{actual sales}}{\text{actual sales}}. \quad (4)$$

In general, a positive bias is indicative of over forecasting and a negative bias is indicative of under forecasting.

Figure 4:
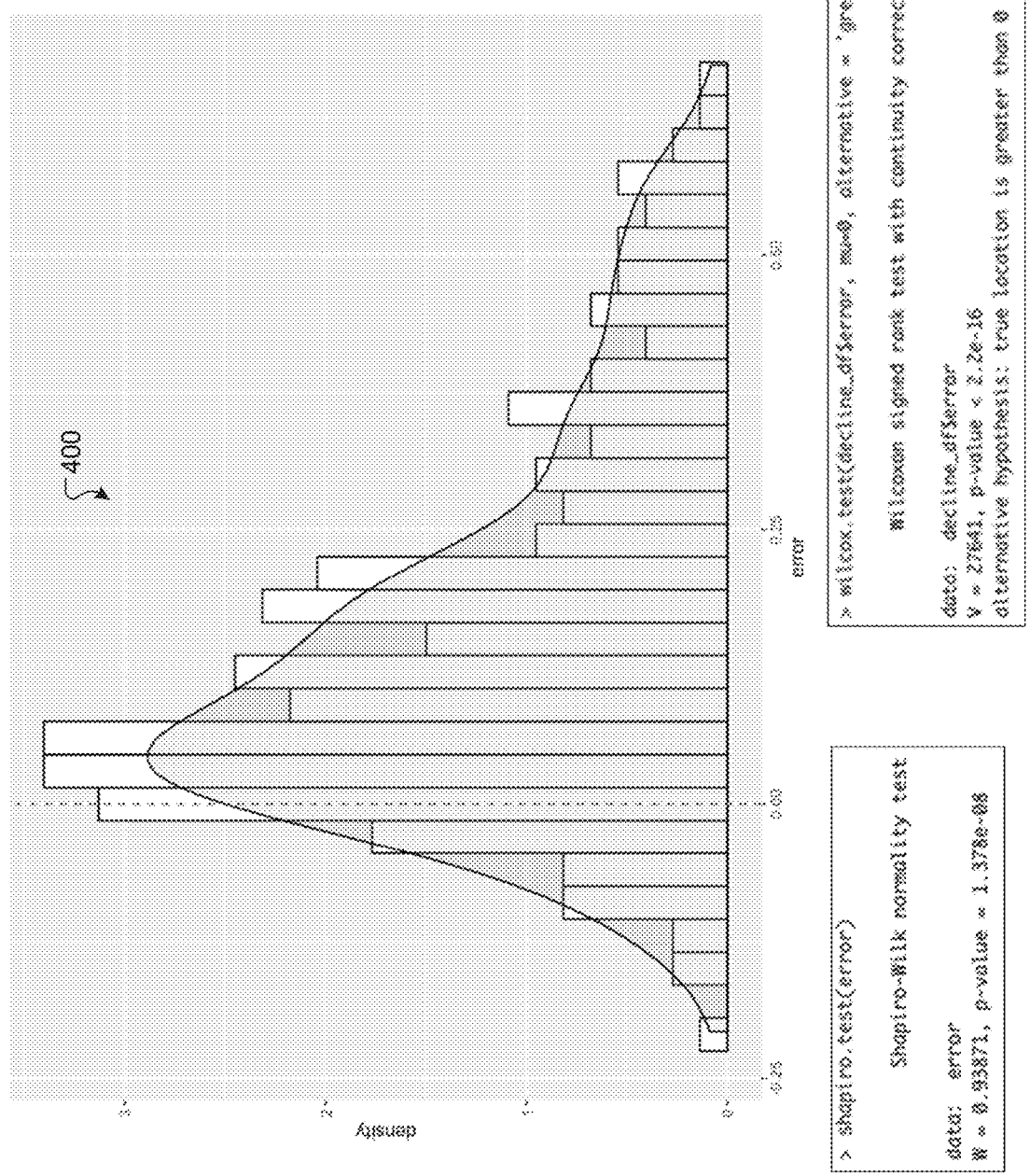
FIG. 4 includes a histogram for an example Wilcoxon Signed-Rank hypothesis test, according to an exemplary embodiment.

Two hypotheses that can be formulated for these sales situations are: $H_o$: $\mu_{bias}=0$ and $H_a$: $\mu_{bias}<0$ for brands with softening sales and $\mu_{bias}>0$ for brands with growing sales. A Wilcoxon test was performed for the bias at a brand level with $H_o$: $\mu_{bias}=0$ and with $H_a$: $\mu_{bias}<0$ or $\mu_{bias}>0$ for growth and decline years, respectively, and results were used to reject the null hypothesis, $H_o$: $\mu_{bias}=0$. This effect can become more pronounced when done at a brand level. For example, after performing a Shapiro-Wilk normality test, it was found that a statistic under consideration is non-normal. Given that the data is non-parametric, Wilcoxon Signed-Rank test was used to test the hypothesis. An example of the hypothesis test is shown in FIG. 4, which includes test results and a histogram 400. Similarly, a test for stable brands failed to reject the null hypothesis, as expected. Such forecasts can be fairly accurate for stable brands.

The aforementioned analysis is an example of how descriptive and diagnostic analytics can provide deeper insights into root causes of problems that can be later leveraged to produce better results. Similar analysis can be done for other variables such as, for example, margin and cost of building blocks (e.g., unit cost). Building blocks that are perceived as premium can have a tendency to be longer in supply.

Advantageously, compared to prior approaches, the systems and methods described herein are able to provide more intelligent and comprehensive recommendations for target stock levels for building blocks. Plans can be made for two or more years out and building blocks can be prepared. As demand is realized, the building blocks can be blended to produce finished products. Final decisions around substitutions can be made after actual demand is realized. In one example, decisions for target stock levels can be made first and then substitutions can be determined later, based on how actual demand depletes the stock levels. The scenario can be simulated using two-stage stochastic programming with recourse, in which supply target levels are determined at a first stage, and adjustments are made at second stage (recourse), for example, to meet demand through substitutions. One challenge associated with simulating such a scenario is properly accounting for substitutions. For example, substitutions can have legal restrictions and/or winemakers can have their own restrictions to ensure product quality is maintained. Cost of substitution may be arbitrary and/or may not be properly considered with previous modeling approaches. In certain implementations, cost of substitution can be a loss or gain of margin when costlier or cheaper building blocks are used as substitutes, respectively. The systems and methods described herein can include limitations around substitutions to respect or consider legal regulations.

In various examples, a general formulation for a two-stage stochastic program with recourse can be as follows:

$$\min_{x \in S} c^T x + E\{Q(x, w)\}, \quad (5)$$

$$s.t. \ Ax=b; x \geq 0, \quad (6)$$

$$\text{where } Q(x,\omega)=\min\{q^T y | Wy=h-Tx, y \geq 0\} \quad (7)$$

where $\omega$ is a vector formed by the components of $q^T$, $h^T$ and T, and $E\{\ \}$ denotes an expectation with respect to $\omega$. In this canonical form of a two-stage stochastic program, c is a cost matrix associated with a decision variable x, A is a coefficient matrix, and b is a RHS matrix for the constraints Ax The objective function can minimize the first-stage decision cost $c^T x$ and the expected value or cost of the recourse $E\{Q(x, \omega)\}$. The objective function in this instance can be as described herein, for example, at Equation (10). In general, the objective function can be used to minimize the expected value and the conditional value-at-risk of holding cost, lost opportunity cost, and/or substitution cost.

A set of building blocks $i \in \{\text{building blocks}\}$ can yield a profit of $p_i$ for every gallon sold and can cost $c_i$ dollars per gallon to produce. A first-stage decision can involve minimizing a total cost of grapes purchased, while applying certain constraints, as described herein. In one example, the constraint in a given scenario can require a sum of target stock and all substitutions to be greater than a demand. Control for shortage and excess supply can be obtained using slack variables that are penalized in the objective function. Additionally or alternatively, a constraint can be or include substitution limitations. For example, a product may need to include at least 85% cabernet to be considered a cabernet product. The modeled constraint in such a case can ensure that any substitutions meet the 85% minimum requirement. Similar constraints can be used for appellation and product tier-based fungibilities. A tier constraint can regulate up tiering (e.g., use of cheaper grapes in premium products), which can severely reduce the quality of wine.

The second stage decision, $E\{Q(x, \omega)\}$, can be complicated because of a variety of different decisions that can be made. For simplicity, this discussion focuses on substitutions as the only available recourse action; however, it is understood that other recourse actions can be available in practice. The recourse actions can include, for example, purchasing or selling wine in the bulk market. With this simplification, $E\{Q(x, \omega)\}$ can be or include a substitution cost, a lost opportunity cost, a holding cost, or any combination thereof. Substitution cost can be determined as loss or gain in margin based on the original cost of the building block being used as a substitute. In some instances, substitution cost can be linearly adjusted or changed to ensure all values are above zero, so that false results due to minimization of the objective function can be avoided. In general, substitutions can be a secondary lever for a business and/or not a source for maximizing profits. In some examples, substitution cost can be or include a processing cost incurred to change the characteristics of a building block, for example, by replacing one building block with another. Lost opportunity cost can be or include a loss in margin that can occur, for example, when the stock level and all possible substitutions cannot meet demand. Holding cost can be incurred when demand is less than supply. The objective function in this example becomes $$\Sigma_i c_i^T x_i + E\{\text{lost opportunity cost+holding cost+substitution cost}\} \quad (8)$$

Figure 5:
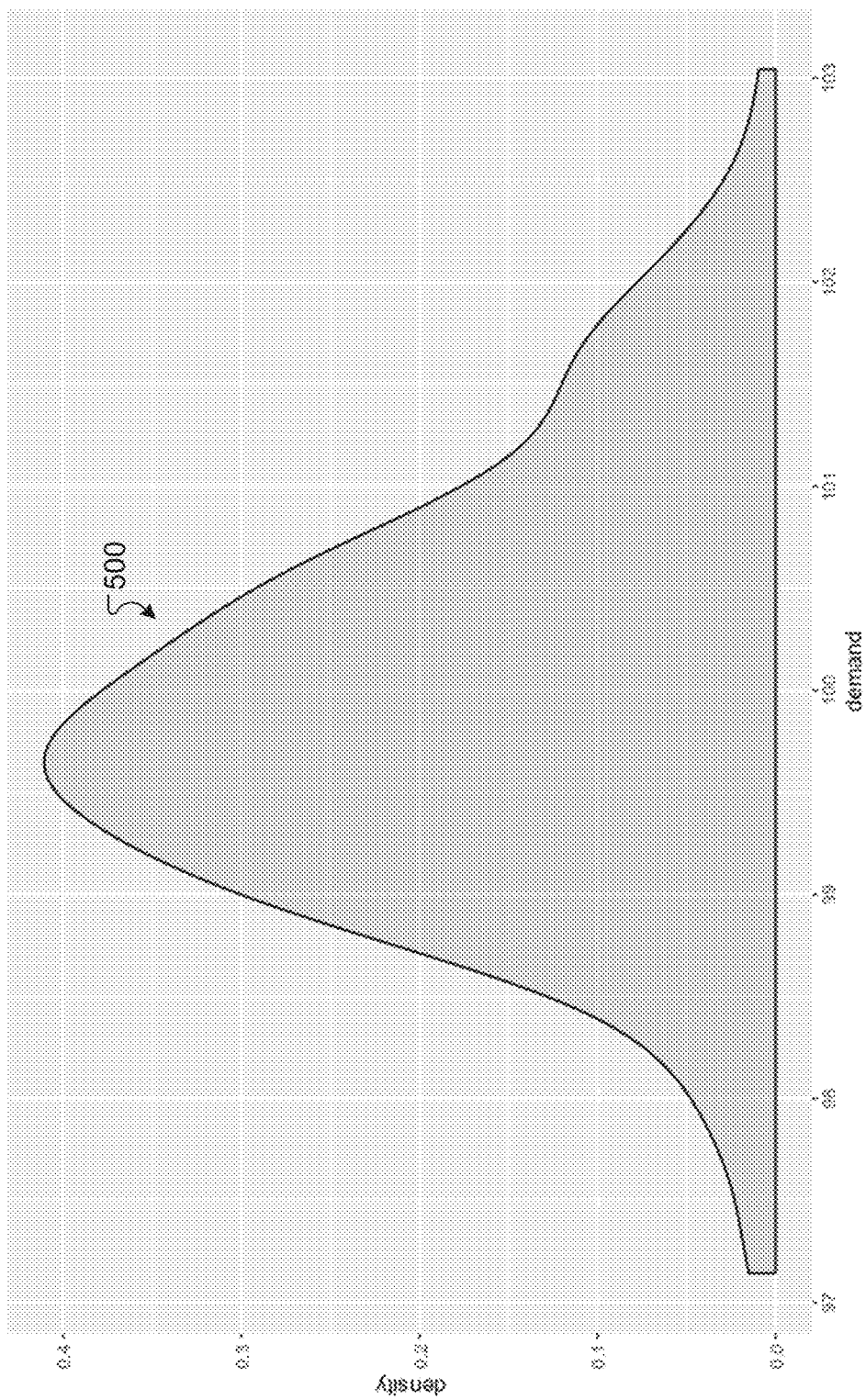
FIG. 5 includes an example demand distribution for a building block or product, according to an exemplary embodiment.

The expectation $E\{Q(x,\omega)\}$ can be a complex function with many interaction terms that can make exact calculations challenging. Therefore, in various examples, approximation methods can be used to estimate $E\{Q(x,\omega)\}$, as described herein. The approximation method can be or include, for example, a Sample Average Approximation (SAA) method or other suitable or similar algorithm that can help sample scenarios from distributions. Further, a forecasting team can provide or publish a point estimate of future demand, and a data analysis step can be performed to calculate errors in the forecast. Forecasting algorithms can provide, for example, an expected value of forecasts in the future. Alternatively or additionally, a forecasting algorithm may not capture prediction intervals of the forecast and/or may involve comparing the accuracy of previous forecasts with actuals to calculate errors (e.g., forecast—actual), which can be normalized by dividing by the actuals. In some instances, various errors can be obtained for different forecasts over time, and a distribution can be fit on these errors, for example, to sample possible errors in the future. These error samples can be used to reverse calculate or predict possible 'actual' values from the forecast. The error and the point estimate can be combined to get a distribution of demand forecast (e.g., for each building block and/or for a final product). FIG. 5 presents an example demand distribution 500.

In various examples, Sample Average Approximation (SAA) techniques can be used to estimate $E\{Q(x,\omega)\}$. Samples can be drawn from the demand distributions (e.g., for each building block and/or for the final product) to approximate possible future scenarios. The expected value of the second stage decision then becomes $$\Sigma_i p_i * (\text{second stage cost for } i^{th} \text{ scenario})_i, \quad (9)$$

where $p_i$ is the probability of $i^{th}$ scenario. In certain instances, SAA can be used to generate one or more scenarios. For example, if demand for each building block follows a normal distribution (e.g., with mean 100 and standard deviation 10), random samples can be generated according to the normal distribution (e.g., using PYTHON libraries such as NUMPY or RANDOM). Once the samples are generated, the likelihood of each scenario can be determined by assuming that each scenario is equally likely. The underlying distribution can take care of sampling more of the likely scenarios. If n samples are generated, for example, then the likelihood or probability of each scenario can be 1/n. In some examples, a wine business may want to meet demand by buying grapes. The primary decision that the model can make is to establish a target stock level, for example, to determine an amount of grapes that the business should obtain to meet most of the demand scenarios in a cost optimal way. In cases where the demand cannot be met, the model can react by substituting from other grapes. In other words, the first decision that the business may make is to decide on an amount of grapes to buy or obtain, and the second decision the business may make, based on how the actual demand comes in, can involve deciding how best to make substitutions or pull substitution levers, as needed, to satisfy demand. The model can mimic this behavior in which a "first stage" decision relates to target stock levels and a "second stage" decision relates to substitutions.

Constraints for the model can be business specific and/or can be based on legal or industry regulations. For example, to call a wine product Cabernet, the product may be required to have more than 85% of cabernet wine. Such constraints can be respected when modeling second-stage substitution decisions. An example constraint around fungibility restrictions is presented in Equation (19), below.

In various examples, the systems and methods utilize a predictive model that employs two-stage stochastic programming with recourse. Table 1 illustrates example model inputs for a system of three grapes. In the first row of this table, for example, the first grape (G1), has a mean demand of 4000 gallons, with variation equal to 200 gallons. The cost of making building block G1 is $2.00 per gallon, and the profit margin is $13.50 per gallon sold.

TABLE 1

Example input data for predictive model

| Building Block | Mean Demand (gallons) | Variation (gallons) | COGS per gallon | Margin per gallon |
|---|---|---|---|---|
| G1 | 4000 | 200 | $2.00 | $13.50 |
| G2 | 3200 | 256 | $2.50 | $10.00 |
| G3 | 1000 | 140 | $4.00 | $5.00 |

Figure 6:
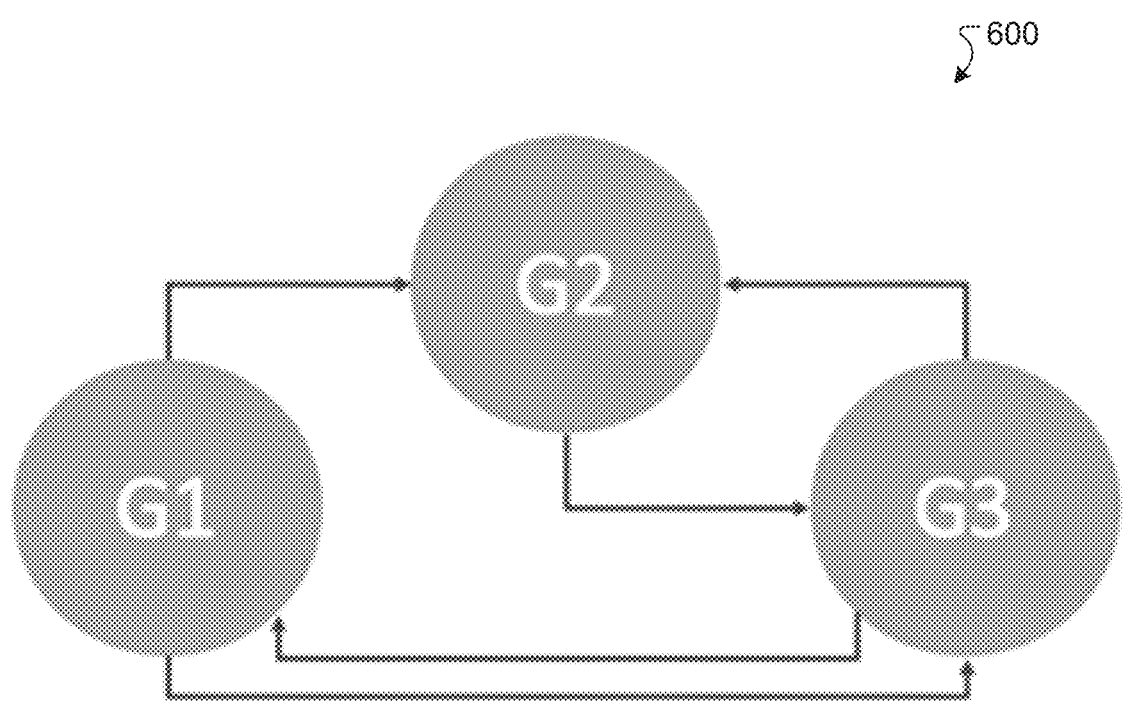
FIG. 6 is a schematic diagram illustrating permissible substitutions among three building blocks, according to an exemplary embodiment.

Substitution details for the model in this example are shown in Table 2 and in FIG. 6, which includes a flowchart 600 illustrating permissible building block substitutions. For example, as the first row in Table 2 indicates, building block G1 can be used as a substitute for building block G2 at a substitution cost of $0.46 per gallon. While this example includes only three building blocks, the complexity can grow as the number of building blocks is increased. As a constraint for the model, the amount of any one building block that can be substituted for another building block can be limited. For example, the model may require a total amount of substitution to be no greater than 15% of a building block's demand.

TABLE 2

Substitution data for building blocks.

| From Building Block | To Building Block | Substitution Cost (gallons) |
|---|---|---|
| G1 | G2 | $0.46 |
| G1 | G3 | $0.49 |
| G2 | G3 | $0.47 |
| G3 | G1 | $0.39 |
| G3 | G2 | $0.41 |

Table 3 shows five demand samples drawn from the demand distribution for the building blocks. Each demand value in these examples is randomly sampled from the distribution, independent of other demand samples (e.g., independent and identically distributed, or IIDs). Each scenario can be assumed to be equally likely.

TABLE 3

Random samples of demand from demand distributions.

| Scenario Number | G1 | G2 | G3 |
|---|---|---|---|
| 1 | 3701 | 3203 | 981 |
| 2 | 3874 | 2824 | 996 |
| 3 | 4171 | 3595 | 669 |
| 4 | 4151 | 3242 | 1039 |
| 5 | 3916 | 3289 | 897 |

In one example, the input data in Tables 1-3 was provided as input to the predictive model, and the predictive model provided as output the following recommended stock levels: G1 —4165 gals, G2—3289 gals, and G3—981 gals. Comparing these recommendations to the values in Table 3, the recommended G1 stock level satisfies 4 out of 5 scenarios, the recommended G2 stock level satisfies 4 out of 5 scenarios, and the recommended G3 stock level satisfies 3 out of 5 stock levels. In this case, the model was able to recognize that G3 has low margins (see Table 1) and, as a result, was willing to take more risk of being short with that building block.

Table 4 illustrates the surplus or deficit of each building block after permissible substitutions have been made for each scenario. For example, while the stock level of 4165 gallons for G1 did not satisfy the demand of 4171 in scenario 3, the overall demand can be satisfied by substituting G1 with G3, as further illustrated in Table 2 and FIG. 6. Table 3 indicates that the current stock levels are sufficient to satisfy all possible scenarios, once necessary and permissible substitutions have been made.

TABLE 4

Scenario details based on model output and building block substitutions.

| Scenario | Building Block | Stock (gals) | Demand (gals) | Sub From (gals) | Sub To (gals) | Surplus (gals) | Deficit (gals) |
|---|---|---|---|---|---|---|---|
| 1 | G1 | 4165 | 3701 | — | — | 464 | — |
| 1 | G2 | 3289 | 3203 | — | — | 86 | — |
| 1 | G3 | 981 | 981 | — | — | — | — |
| 2 | G1 | 4165 | 3874 | — | — | 291 | — |
| 2 | G2 | 3289 | 2824 | 15 | — | 450 | — |
| 2 | G3 | 981 | 996 | — | 15 | — | — |
| 3 | G1 | 4165 | 4171 | — | 6 | — | — |

TABLE 4-continued

Scenario details based on model output and building block substitutions.

| Scenario | Building Block | Stock (gals) | Demand (gals) | Sub From (gals) | Sub To (gals) | Surplus (gals) | Deficit (gals) |
|---|---|---|---|---|---|---|---|
| 3 | G2 | 3289 | 3595 | — | 306 | — | — |
| 3 | G3 | 981 | 669 | 312 | — | — | — |
| 4 | G1 | 4165 | 4151 | 11 | — | 3 | — |
| 4 | G2 | 3289 | 3242 | 47 | — | — | — |
| 4 | G3 | 981 | 1039 | — | 58 | — | — |
| 5 | G1 | 4165 | 3916 | — | — | 250 | — |
| 5 | G2 | 3289 | 3289 | — | — | — | — |
| 5 | G3 | 981 | 897 | — | — | 84 | — |

Figure 7:
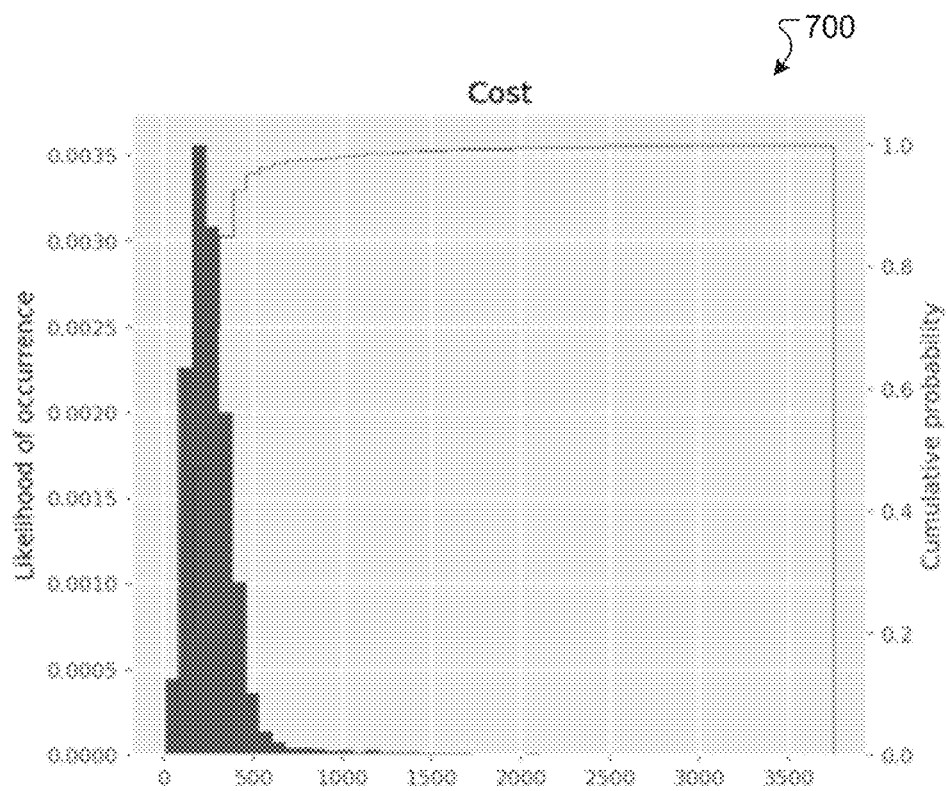
FIG. 7 is an example cost histogram generated using output from a predictive model, according to an exemplary embodiment.
Figure 8:
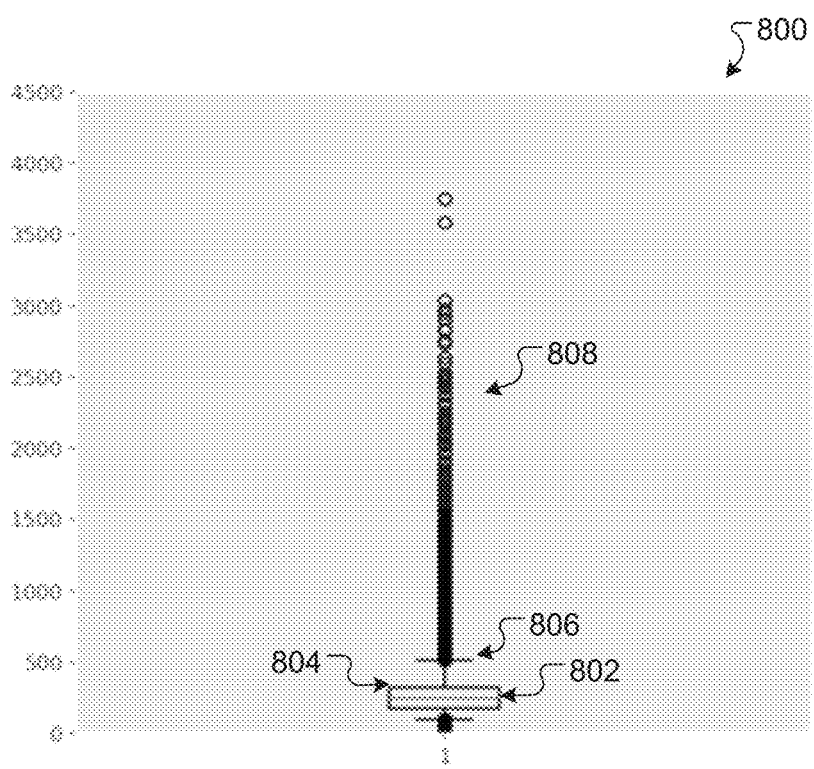
FIG. 8 is an example cost distribution plot generated using output from a predictive model, according to an exemplary embodiment.

The predictive model was run for 10,000 scenarios for this example, and the graphical output of the model can be seen in FIGS. 7 and 8, which include a cost histogram 700 and a cost distribution plot 800, respectively. The cost distribution plot 800 includes a median value 802, a 75th percentile value 804, a 95th percentile value 806, and a tail 808 for values greater than the 95th percentile.

In the cost histogram 700, the x-axis is the cost of each scenario and the y-axis is the likelihood of a scenario occurring. In this example, the expected cost is about $286 and the median cost is about $243, as indicated by the median value 802. As indicated by the cost distribution plot 800, however, there are scenarios where the business could potentially pay significantly more than the expected cost. For example, the standard deviation of the costs is about $252, and the tail 808 indicates that there are possible scenarios where the cost could be over $1000, or as high as about $4000. In general, the risk of exposure to high costs can be illustrated by the tail 800. Accordingly, while the predictive model may be used to reduce or minimize the expected cost, certain examples of the model may not necessarily reduce or eliminate exposure to significantly higher costs.

In other examples, the model can minimize not only future expected cost but also a variability in the expected costs. This can reduce exposure to costs that are significantly higher than the expected cost, as indicated by the tail 808. For example, referring to Table 5, the model can output production values that are risk tolerant (e.g., susceptible to significantly higher costs than expected) or risk averse (e.g., not susceptible to significantly higher costs than expected). The risk tolerant values presented in the table are from an example in which the model minimized future expected cost but did not minimize expected cost variability, as shown in FIGS. 7 and 8. In some examples, a risk tolerant model output can be obtained when only expected value is minimized. Alternatively or additionally, a risk averse model output can be obtained by running the model again (e.g., with expected value minimized) and applying a specified weight on CVaR (Conditional Value at Risk).

TABLE 5

Predicted stock levels for example data after running 10,000 scenarios

| Building Block | Risk Tolerant (gals) | Risk Averse (gals) |
|---|---|---|
| G1 | 4322 | 4460 |
| G2 | 3348 | 3369 |
| G3 | 1076 | 1090 |

Figure 9:
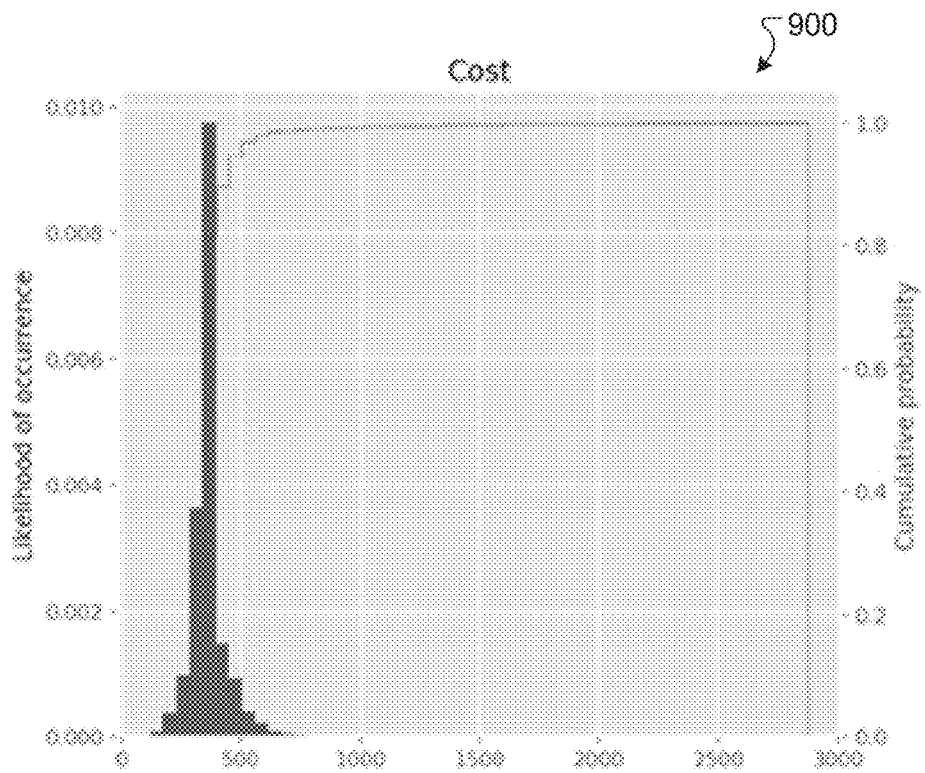
FIG. 9 is an example cost histogram generated using output from a predictive model utilizing conditional value at risk, according to an exemplary embodiment.
Figure 10:
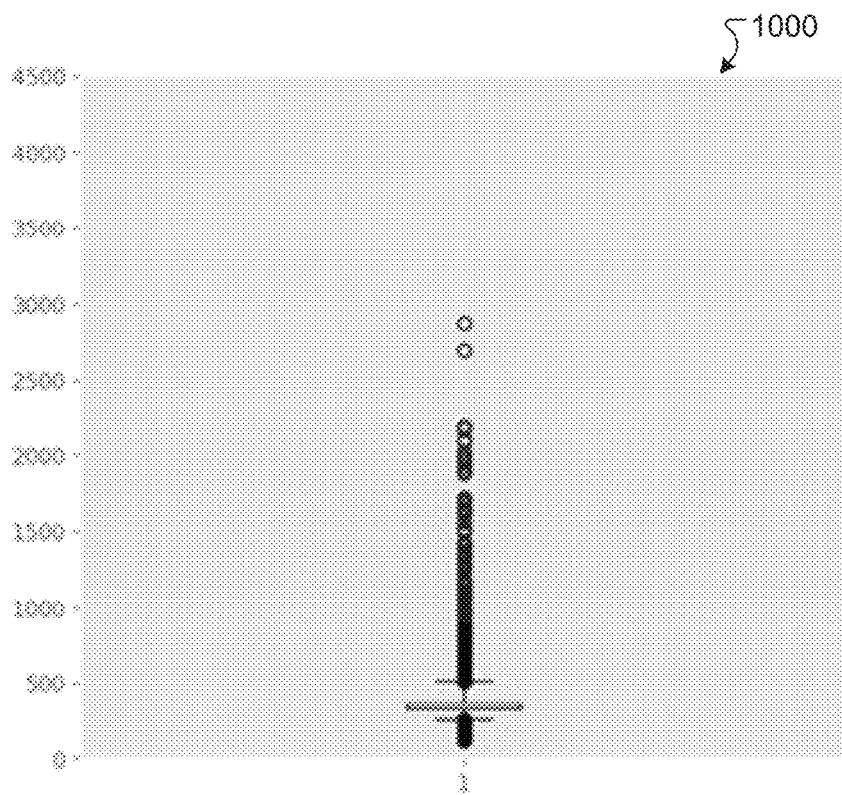
FIG. 10 is an example cost distribution plot generated using output from a predictive model utilizing conditional value at risk, according to an exemplary embodiment.

In another example, FIGS. 9 and 10 include a cost histogram 900 and a cost distribution plot 1000 showing output of the predictive model configured to minimize both expected cost and variability in the expected cost. The model utilized a mean-risk minimization formulation with hyperparameter $\alpha=75\%$, 0% expected value, and 100% CVaR. The hyperparameter $\alpha$ can be adjusted or optimized by running a variety of model scenarios to identify an optimal range or value. The mean or expected cost for the scenarios in this case is about $375, the median cost is about $367, and the standard deviation in cost is about $122, which is significantly lower than the standard deviation of $252 in the example above, when the model was configured to minimize only expected cost and not variability. Compared to the results shown in FIGS. 7 and 8, for example, the results in FIGS. 9 and 10 have less variation in cost among the scenarios but a higher expected cost and a higher median cost. The risk averse values presented in Table 5, above, were obtained from the model predictions in this example and are considerably higher than the risk tolerant values presented in the table. The risk tolerant values in this example can be generated by setting a weight parameter $\beta$ to 1, and the risk averse values can be generated by setting the weight parameter $\beta$ to 0. Setting the weight parameter $\beta$ to 1 may reduce only the expected cost and setting the weight parameter $\beta$ to 0 may reduce only the conditional value at risk (CVaR). In various examples, a user of the systems and methods can adjust the weight parameter $\beta$ to define how much the variation in expected cost should be reduced, at the expense of higher upfront investment.

In general, demand (e.g., for wine, grapes, or other products or materials) can be variable and uncertain, and making decisions around demand can be difficult, inaccurate, or misleading without considering risks associated with erroneous decisions. The risk associated with a decision can be two-sided: when demand is more than supply, business can incur a lost opportunity cost; and when demand is less than supply, business can incur a holding cost. The risk of losing demand can be higher than the risk of holding excess supply. The greatest risk can reside primarily or statistically in the tails of a demand distribution. For example, greater risk can be associated with higher variations and/or heavier tails in the distribution.

In various examples, the objective function for a predictive model can minimize the expected value of the cost of scenarios and/or the conditional value-at-risk and can be as follows:

$$Z = \sum_i \frac{c_i \beta}{n} + nu + \frac{(1-\beta)}{(1-\alpha)n} \sum_i (c_i - nu), \qquad (10)$$

where $c_i$ is the cost of scenario i, $(c_i - nu)$ is the semi-deviation of each scenario, and conditional value at risk theoretically can be given as $E[X|X>\alpha]$. The cost of each scenario can be given by: (holding cost*excess supply)+

(margin*excess demand)+(cost of substitution*substitution received from other grapes)+(cost of substitution*grape under consideration used as substitute). This can be subject to the following:

$$h_b \Sigma_i sl_{ib} + m_b \Sigma_i ss_{ib} + \Sigma_i \Sigma_{b_f} cs_{b_f b} v_{ib_f b} + \Sigma_i \Sigma_{b_t} cs_{bb_t} v_{ibb_t} = c_i \quad (11)$$

$$\forall i,b, \quad (12)$$

where $b_f \in \{$set of building blocks that can be used as substitute for $b\}$ (13)

and $b_t \in \{$set of building blocks that can be substituted with $b\}$. (14)

A semi deviation constraint can be used to calculate a difference between the cost of each scenario and the worst scenario: $c_i$−nu≤$DD_i$. Inventory balancing can be given by: stock target+substitution from other grapes−substitutions to other grapes+(slack variables)>=demand (minimization objective makes it equal), subject to $$y_b + ss_{ib} - sl_{ib} + \Sigma_{b_f} v_{ib_f b} - \Sigma_{b_t} v_{ibb_t} \geq d_{ib} \quad (15)$$

$$\forall i,b, \quad (16)$$

where $b_f \in \{$set of building blocks that can be used as substitute for $b\}$ (17)

and $b_t \in \{$set of building blocks that can be substituted with $b\}$. (18)

As described herein, a substituted amount should not exceed legal requirements or amounts permitted by varietal and appellation fungibility, whichever is lower. This can be represented as $$\Sigma_{b_f} v_{ib_f b} \leq 0.85 d_{ib}, \forall i,b \quad (19)$$

and $$\Sigma_{b_f} v_{ib_f b} \leq S_{b_f b}' d_{ib}, \forall i,b \quad (20)$$

In the preceding model, β=1 can mean the CVaR is not minimized, such that, given a demand uncertainty, the model may simply minimize an average value or expected value. The risk can reside mostly scenarios where demand is far more than supply or supply is far more than demand. β=0 can put significant emphasis on reducing the expected value of the a percentile of worst scenarios. Tuning the hyperparameters ft and a can provide two bounds: risk tolerant and risk averse. The notation for the preceding equations can be as shown in Table 6.

TABLE 6

Notation for model equations.

| Symbol | Description |
| --- | --- |
| b | Building block index |
| i | Index of scenario for each building block b |
| n | Total demand scenarios generated |
| α | Percentile over which scenarios need to be considered for CVaR, α can be a hyperparameter that is determined or optimized by running a variety of different model scenarios. |

TABLE 6-continued

Notation for model equations.

| Symbol | Description |
| --- | --- |
| β | Weight to balance minimizing expected value and CVaR. This can be used or thought of as a variable to control variability reduction. Providing more weight on CVaR can reduce risk but can increase upfront cost. Risk can be defined as scenarios over a percentile. |
| $h_b$ | Holding cost of building block b (e.g., per gallon) |
| $m_b$ | Margin for each building block b (e.g., per gallon) |
| $d_{ib}$ | Demand for building block b in scenario i |
| $S_{b_f b}'$ | Percentage of demand for building block b that can be substituted with building block $b_f$ |
| $y_b$ | Stock level for building block b |
| $ss_{ib}$ | Slack variable for scenario where demand > supply for building block b in scenario i |
| $sl_{ib}$ | Slack variable for scenario where demand < supply for building block b in scenario i |
| nu | Extreme tail point of the cost of scenarios (e.g., worst solution) |
| $v_{ib_f b_t}$ | Substitution quantity from building block $b_f$ to building block $b_t$ in scenario i |
| $c_i$ | Cost of scenario i |
| $cs_{b_f b_t}$ | Substitution cost for building block $b_f$ to building block $b_t$ |
| $DD_i$ | Difference between the cost of scenario i and the worst scenario nu |

In various examples, the systems and methods described herein can be implemented in or packaged as an add-on or app that can be integrated with one or more available enterprise systems, such as SAP, ANAPLAN, or JDA. Alternatively or additionally, the systems and methods can be packaged as a PYTHON library. In some instances, for example, the predictive model can be built using PYTHON and/or can use a mixed-integer program (MIP) that can be solved using an optimization solver such as, for example, GUROBI, CPLEX, or FICO, or open source libraries such as, for example, SCIPY, PuLP, or PyOpt. Depending on where the solver is being used, the systems and methods can be built or implemented on a cloud server or any internal platform.

Figure 11:
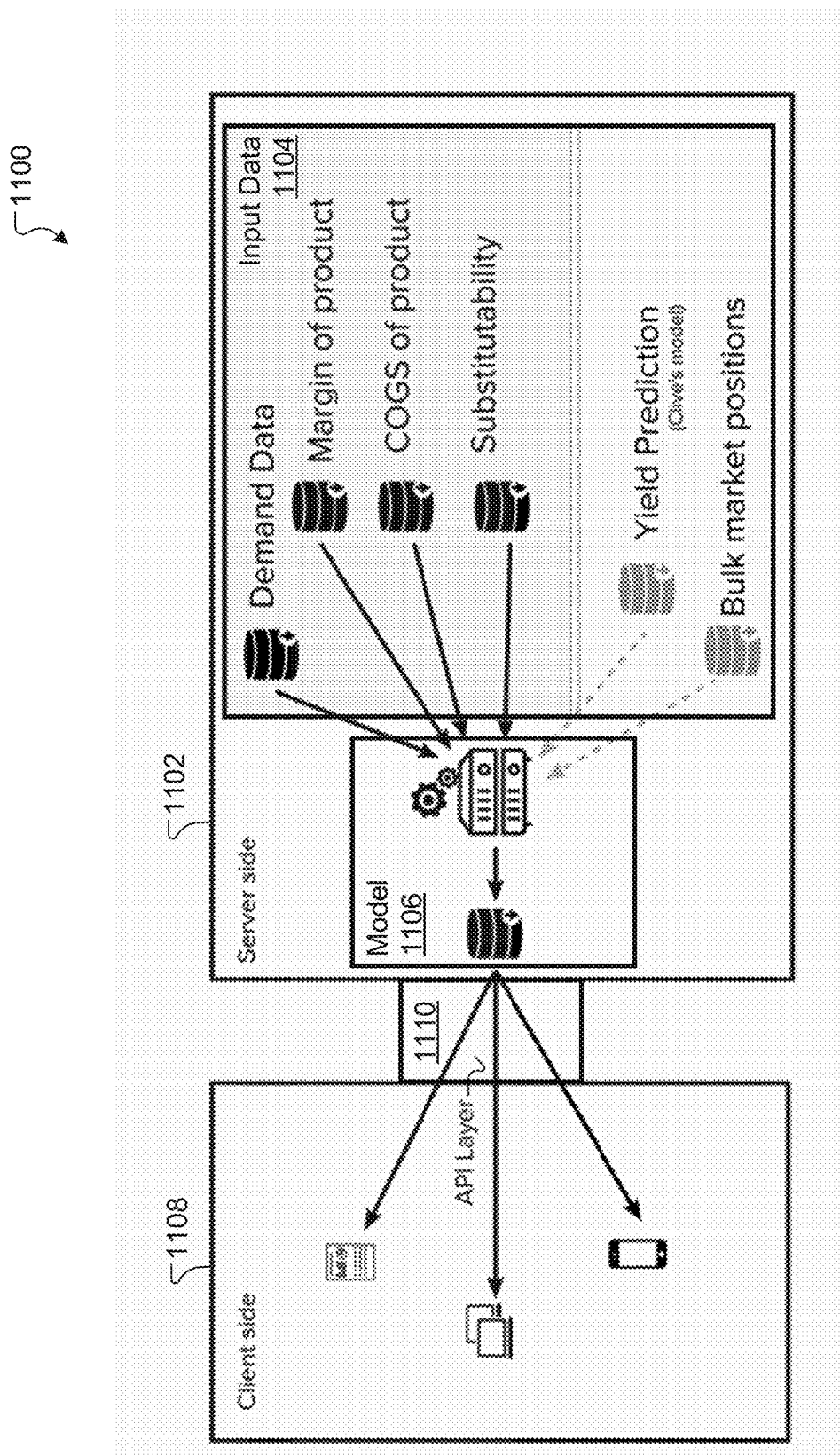
FIG. 11 is schematic diagram of an example client-server architecture, according to an exemplary embodiment.

FIG. 11 is a schematic diagram of an example client-server system 1100 that can be used to implement the systems and methods described herein. A server side 1102 of the system 1100 includes an input data layer 1104 and a model layer 1106. A client side 1108 of the system 1100 can interact with the server side 1102 through an API layer 1110.

In various examples, the input data layer 1104 can provide input data to the model layer 1106. The input data can be or include, for example, forecasting data, cost data for making the product and/or building block (e.g., unit cost), profit margins expected from selling the product and/or building block, and/or information on which products or building blocks are substitutable and to what degree (e.g., constraints on substitutions). The input data can be manipulated (e.g., using PYTHON) in preparation for being input to the predictive model in the model layer 1106. At least a portion of the input data can be obtained from enterprise software, such as SAP.

In some instances, for example, the input data for the predictive model can include demand forecasts for the various building blocks and/or products. The model can be used for strategic planning of building blocks used to generate products 2 to 5 years or more in the future. As explained herein, historical data analysis can reveal bias in forecasting depending on whether a product's sales are growing or softening. Such historical data can be used to calculate the bias and extrapolate it to future years, which can help with the sampling of future scenarios over which decisions are made.

Additionally or alternatively, the input data can include cost data for the building blocks and/or products. Such cost data can include, for example, cost of goods sold (COGS), unit cost, and/or a profit margin. The cost of making a product or building block can be a measure of invested capital. When supply is more than demand, for example, the invested capital is not being used for its original purpose, and additional costs may be incurred for storage of excess supply. The margin can be a measure of lost opportunity in instances where supply is less than demand. In general, the margin and COGS can be opposing in nature. Too much supply can increase COGS (e.g., holding costs) and not enough supply can increase lost opportunity costs. In general, the predictive model in the model layer 1106 is configured to balance such costs while ensuring demand is met for most of the scenarios generated.

Further, the predictive model can be configured to consider permissible substitutions that can be made between the building blocks. This is an important factor that was not considered by previous approaches. For example, in traditional modelling paradigms, when supply is less than demand, the model can penalize the objective with lost opportunity cost. With the predictive model described herein, however, when supply is less than demand for a building block, other building blocks can be used as substitutes if the supply for that building block exceeds demand. The cost of substituting can be at least somewhat offset by a reduction in holding cost; however, the cost of substitution is usually less than a corresponding loss of margin. The amount of permissible substitutions can be governed by legal or industry constraints, as described herein. In general, a likelihood of being short of supply for two grapes together is less than a likelihood of one of them being short. The predictive model can exploit this factor and reduce the overall target stock, thereby saving costs.

In various examples, the input data can include other factors, such as, for example, yield of vineyards, bulk wine market, and the like, that can be used by the model for determining target stock levels. Additionally or alternatively, machine learning models can be used to predict each of the aforementioned factors. The methodology of calculating costs can be updated or revised, over time, as needed.

The model layer 1106 can be hosted on the server side (e.g., a LINUX server), for example, where GUROBI is installed as a solver. The predictive model in the model layer can make predictions (e.g., predict building block amounts) and save results in a data file (e.g., a MICROSOFT EXCEL file) and/or a database.

On the client side 1108, output data saved by the model can be fed to a dashboard (e.g., a TABLEAU dashboard, web page, or other data visualization tool) that users can interact with using one or more client devices (e.g., personal computers or mobile devices). The dashboard can provide a graphical user interface that allows users to generate plots and/or tables of model results. The model is generally able to be implemented on a wide variety of suitable architectures, according to user needs.

Figure 12:
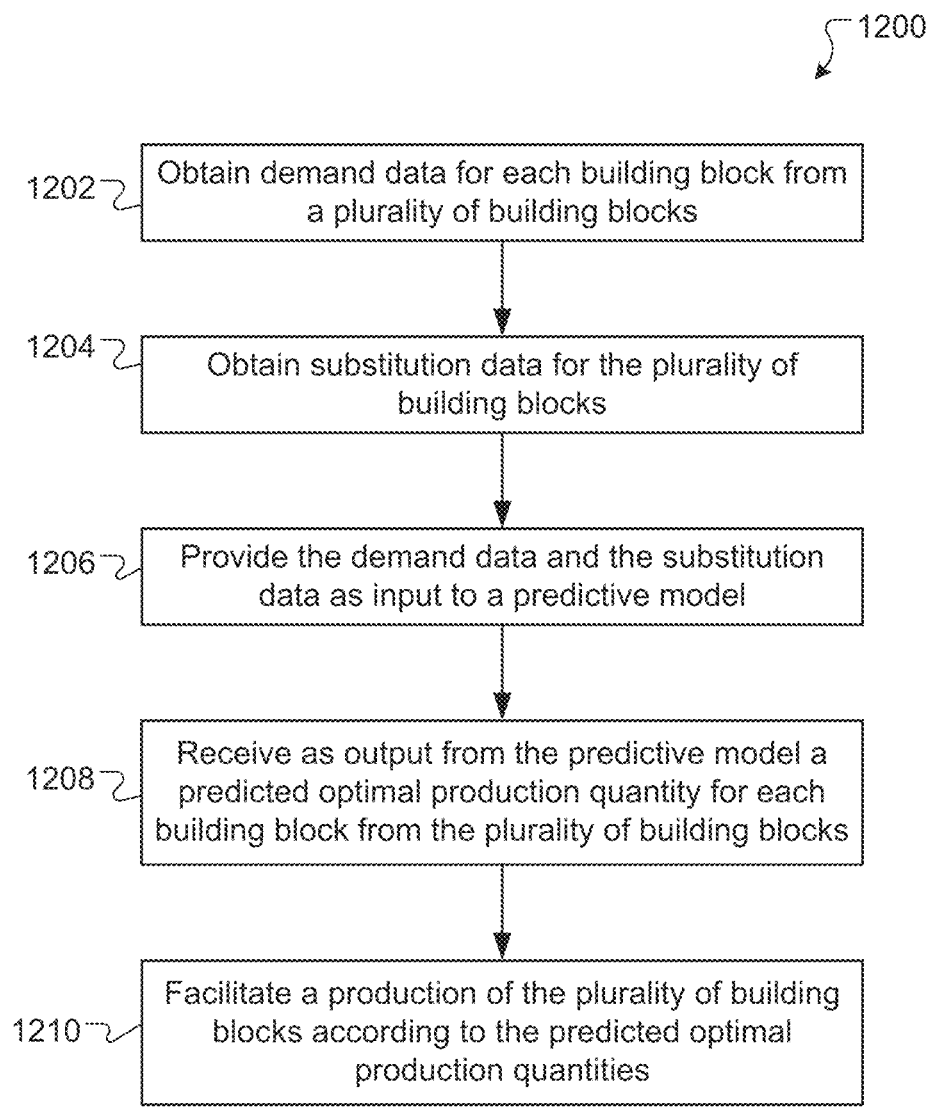
FIG. 12 is a flowchart of an example method of managing a supply of building blocks for one or more products, according to an exemplary embodiment.

FIG. 12 is a flowchart of an example method 1200 of managing a supply of building blocks for one or more products. Demand data is obtained (step 1202) for each building block from a plurality of building blocks. The demand data includes (i) a projected demand distribution for each building block and (ii) cost data for each building block. Substitution data is obtained (step 1204) for the plurality of building blocks. The substitution data includes (i) an identification of one or more permissible building block substitutions in which one building block is substituted for another building block and (ii) a substitution cost associated with each permissible building block substitution. The demand data and the substitution data are provided (step 1206) as input to a predictive model. A predicted optimal production quantity for each building block is received (step 1208) as output from the predictive model. Production of the plurality of building blocks is facilitated (step 1210) according to the predicted optimal production quantities. Facilitating the production can include, for example, producing the building blocks, providing assistance or guidance related to the production of the building blocks, and/or providing model predictions to an individual or entity that produces the building blocks.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 13:
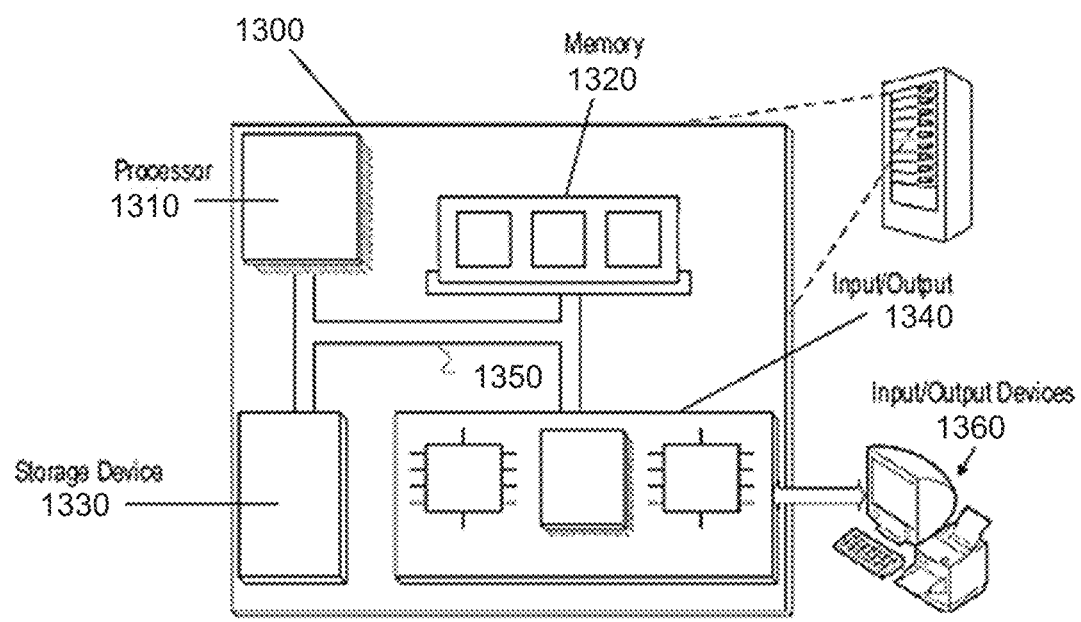
FIG. 13 is a block diagram of an example computer system, according to an exemplary embodiment.

FIG. 13 is a block diagram of an example computer system 1300 that may be used in implementing the technology described herein. General-purpose computers, network appliances, mobile devices, or other electronic systems may also include at least portions of the system 1300. The system 1300 includes a processor 1310, a memory 1320, a storage device 1330, and an input/output device 1340. Each of the components 1310, 1320, 1330, and 1340 may be interconnected, for example, using a system bus 1350. The processor 1310 is capable of processing instructions for execution within the system 1300. In some implementations, the processor 1310 is a single-threaded processor. In some implementations, the processor 1310 is a multi-threaded processor. The processor 1310 is capable of processing instructions stored in the memory 1320 or on the storage device 1330.

The memory 1320 stores information within the system 1300. In some implementations, the memory 1320 is a non-transitory computer-readable medium. In some implementations, the memory 1320 is a volatile memory unit. In some implementations, the memory 1320 is a non-volatile memory unit.

The storage device 1330 is capable of providing mass storage for the system 1300. In some implementations, the storage device 1330 is a non-transitory computer-readable medium. In various different implementations, the storage device 1330 may include, for example, a hard disk device, an optical disk device, a solid-state drive, a flash drive, or some other large capacity storage device. For example, the storage device may store long-term data (e.g., database data, file system data, etc.). The input/output device 1340 provides input/output operations for the system 1300. In some implementations, the input/output device 1340 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1330 may be implemented in a distributed way over a network, such as a server farm or a set of widely distributed servers, or may be implemented in a single computing device.

Although an example processing system has been described in FIG. 13, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method of managing a supply of building blocks for one or more products, the method comprising:
    providing input data to a computer-implemented predictive model configured to perform two-stage stochastic programming with recourse, the input data comprising:
        demand data for each building block from a plurality of building blocks, wherein the plurality of building blocks are to be produced and then aged for at least a year before being combined to form the one or more products, wherein the demand data comprises (i) a projected demand distribution for each building block and (ii) cost data for each building block, and wherein each demand distribution comprises a probability distribution comprising forecasted probabilities for a range of possible demands for the respective building block; and
        substitution data for the plurality of building blocks, the substitution data comprising (i) an identification of one or more permissible building block substitutions in which one building block is substituted for another building block and (ii) a substitution cost associated with each permissible building block substitution,
        wherein at least a portion of the input data is obtained from an enterprise software system;
    receiving as output from the computer-implemented predictive model a predicted optimal production quantity for each building block from the plurality of building blocks,
        wherein the computer-implemented predictive model outputs the predicted optimal quantity by executing an optimization solver software application or open source computer programming libraries; and
    facilitating a production of the plurality of building blocks according to the predicted optimal production quantities,
        wherein facilitating the production comprises saving the output in a computer data file readable by a spreadsheet software application.

2. The method of claim 1, wherein the building blocks comprise a plurality of grape juice varieties, and wherein each building block comprises a distinct variety from the grape juice varieties.

3. The method of claim 2, wherein the one or more products comprise wine.

4. The method of claim 1, wherein each demand distribution comprises forecasted demands for a future time at least two years from a present time.

5. The method of claim 1, wherein the cost data comprises at least one of a unit cost or a profit margin.

6. The method of claim 1, wherein the one or more permissible building block substitutions comprise one or more constraints imposing a limit on an amount of a first building block that can be substituted for a second building block.

7. The method of claim 1, wherein the computer-implemented predictive model is further configured to utilize conditional value at risk (CVaR).

8. The method of claim 1, wherein the predicted optimal production quantity comprises at least one of a risk tolerant prediction or a risk averse prediction.

9. The method of claim 1, wherein the two-stage stochastic programming with recourse comprises determining supply target levels at a first stage and making adjustments at a second stage to meet demand through substitutions.

10. A system comprising:
    one or more computer systems programmed to perform operations comprising:
        providing input data to a computer-implemented predictive model configured to perform two-stage stochastic programming with recourse, the input data comprising:
            demand data for each building block from a plurality of building blocks, wherein the plurality of building blocks are to be produced and then aged for at least a year before being combined to form the one or more products, wherein the demand data comprises (i) a projected demand distribution for each building block and (ii) cost data for each building block, and wherein each demand distribution comprises a probability distribution comprising forecasted probabilities for a range of possible demands for the respective building block; and
            substitution data for the plurality of building blocks, the substitution data comprising (i) an identification of one or more permissible building block substitutions in which one building block is substituted for another building block and (ii) a substitution cost associated with each permissible building block substitution,
            wherein at least a portion of the input data is obtained from an enterprise software system;
        receiving as output from the computer-implemented predictive model a predicted optimal production quantity for each building block from the plurality of building blocks,
            wherein the computer-implemented predictive model outputs the predicted optimal quantity by executing an optimization solver software application or open source computer programming libraries; and facilitating a production of the plurality of building blocks according to the predicted optimal production quantities,
  wherein facilitating the production comprises saving the output in a computer data file readable by a spreadsheet software application.

11. The system of claim 10, wherein the building blocks comprise a plurality of grape juice varieties, and wherein each building block comprises a distinct variety from the grape juice varieties.

12. The system of claim 11, wherein the one or more products comprise wine.

13. The system of claim 10, wherein each demand distribution comprises forecasted demands for a future time at least two years from a present time.

14. The system of claim 10, wherein the cost data comprises at least one of a unit cost or a profit margin.

15. The system of claim 10, wherein the one or more permissible building block substitutions comprise one or more constraints imposing a limit on an amount of a first building block that can be substituted for a second building block.

16. The system of claim 10, wherein the computer-implemented predictive model is further configured to utilize conditional value at risk (CVaR).

17. The system of claim 10, wherein the predicted optimal production quantity comprises at least one of a risk tolerant prediction or a risk averse prediction.

18. The system of claim 10, wherein the two-stage stochastic programming with recourse comprises determining supply target levels at a first stage and making adjustments at a second stage to meet demand through substitutions.

19. A non-transitory computer-readable medium having instructions stored thereon that, when executed by one or more computer processors, cause the one or more computer processors to perform operations comprising:
  providing input data to a computer-implemented predictive model configured to perform two-stage stochastic programming with recourse, the input data comprising:
    demand data for each building block from a plurality of building blocks, wherein the plurality of building blocks are to be produced and then aged for at least a year before being combined to form the one or more products, wherein the demand data comprises (i) a projected demand distribution for each building block and (ii) cost data for each building block, and wherein each demand distribution comprises a probability distribution comprising forecasted probabilities for a range of possible demands for the respective building block; and
    substitution data for the plurality of building blocks, the substitution data comprising (i) an identification of one or more permissible building block substitutions in which one building block is substituted for another building block and (ii) a substitution cost associated with each permissible building block substitution, wherein at least a portion of the input data is obtained from an enterprise software system;
  receiving as output from the computer-implemented predictive model a predicted optimal production quantity for each building block from the plurality of building blocks,
    wherein the computer-implemented predictive model outputs the predicted optimal quantity by executing an optimization solver software application or open source computer programming libraries; and
  facilitating a production of the plurality of building blocks according to the predicted optimal production quantities,
    wherein facilitating the production comprises saving the output in a computer data file readable by a spreadsheet software application.

* * * * *